(12) United States Patent
Fujimoto et al.

(10) Patent No.: US 10,538,066 B2
(45) Date of Patent: Jan. 21, 2020

(54) METHOD OF FORMING TOPPING SHEET AND APPARATUS THEREOF

(71) Applicant: TOYO TIRE & RUBBER CO., LTD., Osaka-shi, Osaka (JP)

(72) Inventors: Masaya Fujimoto, Osaka (JP); Kazuhiro Kobayashi, Osaka (JP)

(73) Assignee: TOYO TIRE CORPORATION, Itami-shi, Hyogo (JP)

( * ) Notice: Subject to any disclaimer, the term of this patent is extended or adjusted under 35 U.S.C. 154(b) by 188 days.

(21) Appl. No.: 15/491,362

(22) Filed: Apr. 19, 2017

(65) Prior Publication Data
US 2017/0313035 A1    Nov. 2, 2017

(30) Foreign Application Priority Data
Apr. 27, 2016    (JP) .................. 2016-089783

(51) Int. Cl.
*B32B 25/10* (2006.01)
*B32B 5/02* (2006.01)
(Continued)

(52) U.S. Cl.
CPC .............. *B32B 25/10* (2013.01); *B29C 43/28* (2013.01); *B29C 69/001* (2013.01);
(Continued)

(58) Field of Classification Search
CPC ........ B29D 30/38; B29D 30/46; B29D 30/58; B29D 2030/466; B29D 2030/386;
(Continued)

(56) References Cited

U.S. PATENT DOCUMENTS

| 1,452,379 A | 4/1923 | Haren et al. |
| 5,989,374 A | 11/1999 | Bull et al. |

(Continued)

FOREIGN PATENT DOCUMENTS

| CN | 1160631 A | 10/1997 |
| CN | 1411979 A | 4/2003 |

(Continued)

OTHER PUBLICATIONS

Extended European Search Report dated Sep. 4, 2017, issued in Application No. 17167144.9 (corresponding to U.S. Appl. No. 15/491,416).

(Continued)

*Primary Examiner* — Anthony Calandra
*Assistant Examiner* — S. Behrooz Ghorishi
(74) *Attorney, Agent, or Firm* — Westerman, Hattori, Daniels & Adrian LLP (57) ABSTRACT

A topping sheet forming method includes: a feeding and division step of feeding a textile original fabric, obtained by weaving longitudinally aligned tire cords into a cord fabric by use of weft yarns, and cutting off the weft yarns in predetermined widthwise positions to divide the textile original fabric into a plurality of narrow textile original fabrics; a calender step of topping, with unvulcanized rubber, at least one surface of one narrow textile original fabric out of the divided narrow textile original fabrics; and a wind-up step of winding up the other narrow textile original fabrics out of the divided narrow textile original fabrics.

4 Claims, 6 Drawing Sheets

(51) Int. Cl.
  *B32B 37/14* (2006.01)
  *D03D 1/02* (2006.01)
  *B65H 23/038* (2006.01)
  *B29C 43/28* (2006.01)
  *B29C 69/00* (2006.01)
  *B29D 30/46* (2006.01)
  *B29D 30/38* (2006.01)
  *B29D 30/00* (2006.01)
  *B29C 43/24* (2006.01)

(52) U.S. Cl.
  CPC ......... *B29D 30/0016* (2013.01); *B29D 30/38* (2013.01); *B29D 30/46* (2013.01); *B32B 5/024* (2013.01); *B32B 37/14* (2013.01); *B65H 23/038* (2013.01); *D03D 1/02* (2013.01); *B29C 43/24* (2013.01); *B29D 2030/466* (2013.01); *B65H 2301/4148* (2013.01)

(58) Field of Classification Search
  CPC ... B29D 2030/385; B29C 43/24; B29C 43/28; B29C 2043/182; B26D 2001/008; B26D 1/025; B26D 1/035; B65H 35/02; B65H 35/00; B32B 25/10; B32B 5/024; B32B 37/14
  See application file for complete search history.

(56) References Cited

U.S. PATENT DOCUMENTS

| | | | | |
|---|---|---|---|---|
| 6,148,871 | A * | 11/2000 | Hassell | B26D 1/035 139/420 A |
| 9,944,034 | B2 * | 4/2018 | Fujimoto | B29D 30/3007 |
| 10,065,341 | B2 * | 9/2018 | Fujimoto | B65H 35/08 |
| 2003/0070742 | A1 | 4/2003 | Risser et al. | |
| 2005/0048857 | A1 | 3/2005 | Terschueren et al. | |
| 2009/0249597 | A1 | 10/2009 | Tatara et al. | |
| 2009/0249598 | A1 | 10/2009 | Tatara et al. | |
| 2016/0001502 | A1 | 1/2016 | Urabe | |

FOREIGN PATENT DOCUMENTS

| | | |
|---|---|---|
| CN | 1765614 A | 5/2006 |
| CN | 104995006 A | 10/2015 |
| DE | 2314889 A1 | 10/1974 |
| DE | 2433288 A1 | 2/1975 |
| EP | 1226925 A1 | 7/2002 |
| JP | H07070869 A | 3/1995 |
| JP | 2011073439 A | 4/2011 |
| JP | 2012-161969 A | 8/2012 |
| WO | 2007/007405 A1 | 1/2007 |

OTHER PUBLICATIONS

Extended European Search Report dated Sep. 1, 2017, issued in Application No. 17167137.3 (corresponding to U.S. Appl. No. 15/491,360).
Non Final Office Action issued in U.S. Appl. No. 15/491,416, dated Jun. 29, 2017.
Non Final Office Action issued in U.S. Appl. No. 15/491,360, dated Jul. 3, 2017.
Non Final Office Action issued in U.S. Appl. No. 15/491,358, dated Jun. 28, 2017.
Office Action dated Nov. 5, 2018, issued in counterpart Chinese Application No. 201710237192.1, with English translation. (10 pages).
Office Action dated Nov. 5, 2018, issued in Chinese Application No. 201710234865.8 (which is counterpart to U.S. Appl. No. 15/491,360); with English translation. (10 pages).
Office Action dated Jan. 3, 2019, issued in CN Application No. 201710235022.X, with English translation corresponds to U.S. Appl. No. 15/491,416 (11 pages).
Office Action dated Jan. 3, 2019, issued in CN Application No. 201710242096.6, with English translation corresponds to U.S. Appl. No. 15/491,358 (11 pages).

* cited by examiner

METHOD OF FORMING TOPPING SHEET AND APPARATUS THEREOF

CROSS-REFERENCE TO RELATED APPLICATION

This application claims priority of Japanese Patent Application No.: 2016-89783 filed on Apr. 27, 2016, the content of which is incorporated herein by reference.

BACKGROUND OF THE INVENTION

Technical Field

The present invention relates to a method of forming a topping sheet and an apparatus thereof.

Related Art

For forming carcass ply that makes a skeleton of a pneumatic tire, first, a textile original fabric, obtained by weaving longitudinally aligned tire cords into a cord fabric by use of weft yarns, is prepared and then topped with unvulcanized rubber to form a topping sheet. Subsequently, the topping sheet is cut off into a length corresponding to a width of the carcass ply to form strip-shaped ply pieces. Further, non-cut ends of these ply pieces are sequentially connected to form a long ply original fabric. Then, the ply original fabric is wound around a molding drum to be expanded outer-diametrically and molded by vulcanization in a tire vulcanizing mold, thereby forming carcass ply.

Each carcass ply has a different width depending on the size and specification of the pneumatic tire, and the ply original fabric is formed for each carcass ply. The ply original fabric is once stored in a wound state as an intermediate molded article (intermediate work-in-process) and is then released at the time of molding the corresponding pneumatic tire. This leads to complex production control on the ply original fabric. In order to facilitate the production control on the ply original fabric, it has been proposed that the ply original fabric be directly supplied to a molding step without being stored as the intermediate molded article (e.g., WO2007/007405).

The direct supply of the ply original fabric to the molding step requires a compact configuration of an apparatus for forming the ply original fabric because of constraint on equipment arrangement space. For this reason, the topping sheet has been configured to have a width as narrow as about 0.5 m, for example.

However, the topping sheet is typically formed of a wide textile original fabric having a width of about 1.4 m to 1.5 m. That is, a narrow topping sheet has been formed by first topping a wide textile original fabric with the unvulcanized rubber to form a wide topping sheet, and then dividing this sheet widthwise. Another method has also been proposed where tire cords are supplied from a large number of cord bobbins to form a narrow cord original fabric, and this is topped with the unvulcanized rubber to form a narrow topping sheet (e.g., JP 2012-161969 A).

SUMMARY

However, in the former method, since the wide topping sheet is topped with the unvulcanized rubber, dividing this sheet widthwise is not easy. Further, a calender line that makes topping with the unvulcanized rubber increases in size widthwise in accordance with the wide textile original fabric. Meanwhile, in the latter method, a calender unit can be reduced in size, but it takes labor to set the large number of cord bobbins. In short, it has not been possible to efficiently form the narrow topping sheet.

Accordingly, an object of the present invention is to efficiently form a narrow topping sheet.

As means to solve the above problem, the present invention provides a topping sheet forming method that includes: a feeding and division step of feeding a textile original fabric, obtained by weaving longitudinally aligned tire cords into a cord fabric by use of weft yarns, and cutting off the weft yarns in predetermined widthwise positions to divide the textile original fabric into a plurality of narrow textile original fabrics; a calender step of topping, with unvulcanized rubber, at least one surface of one of the divided narrow textile original fabrics; and a wind-up step of winding up the other of the divided narrow textile original fabrics.

According to the above, the textile original fabric can be fed and divided simultaneously, thus eliminating the need for the cord original fabric preparing step of previously preparing the narrow textile original fabric, and enabling one narrow textile original fabric to be directly supplied from the textile original fabric and topped with the unvulcanized rubber. Thereby, equipment for the cord original fabric preparing step becomes unnecessary, and it is thus possible to achieve the space saving, and efficiently form the narrow topping sheet, while reducing production cost. Further, by winding up the other narrow textile original fabric, it is possible to prepare for the next topping step, while preventing the cord from slipping off the cut-off edge.

In the wind-up step, the other narrow textile original fabric is preferably wound up through a film.

According to the above, it is possible to prevent the cord from slipping off the other narrow textile original fabric having been wound up.

The textile original fabric is preferably fed by detecting widthwise displacement of the one textile original fabric being fed, and moving the textile original fabric widthwise so as to eliminate the detected displacement.

According to the above, it is possible to feed the textile original fabric while preventing widthwise displacement, and appropriately carry out the subsequent topping step, and the like.

As means to solve the above problem, the present invention further provides a topping sheet forming apparatus that includes: a feeding and division part that feeds a textile original fabric, obtained by weaving longitudinally aligned tire cords into a cord fabric by use of weft yarns, and cuts off the weft yarns in predetermined widthwise positions to divide the textile original fabric into a plurality of narrow textile original fabrics; a calender part that tops at least one surface of one narrow textile original fabric out of the narrow textile original fabrics, divided by the feeding and division part, with unvulcanized rubber to form a narrow topping sheet; and a wind-up part that winds up the other narrow textile original fabric out of the narrow textile original fabrics divided by the feeding and division part.

According to the present invention, since the narrow textile original fabric can be supplied directly from the textile original fabric and topped with the unvulcanized rubber, it is possible to efficiently form the narrow topping sheet, while reducing production cost. Further, since the simultaneously obtained narrow textile original fabric can be wound up, the subsequent topping step can be started immediately, and also in this respect, it is possible to efficiently form the narrow topping sheet.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

Hereinafter, an embodiment according to the present invention is described in accordance with the attached drawings. Note that the following description is merely illustrative in nature and is not intended to limit the present invention, the application thereof, or the uses thereof. The drawings are made schematically, with dimensional ratios and the like different from actual ones.

A carcass ply forming step according to one embodiment of the present invention is carried out by a calender step, a ply original fabric forming step, and a molding step. In the calender step, at least one surface of a narrow textile original fabrics, obtained by dividing a textile original fabric 100, is topped with unvulcanized rubber to create a topping sheet. In the ply original fabric forming step, the topping sheet is cut off into a length corresponding to a width of the carcass ply to form strip-shaped ply pieces. Further, non-cut ends of these ply pieces are sequentially connected to form a long ply original fabric. In the molding step, the ply original fabric is wound around a molding drum to be expanded outer-diametrically and molded by vulcanization in a tire vulcanizing mold, thereby forming carcass ply.

The present invention is characterized in that in the calender step, the narrow topping sheet is formed directly from the wide textile original fabric. Hereinafter, the calender step will be described in detail, the ply original fabric forming step will be described briefly, and a description of the molding step will be omitted.

(Calender Step)

Figure 1:
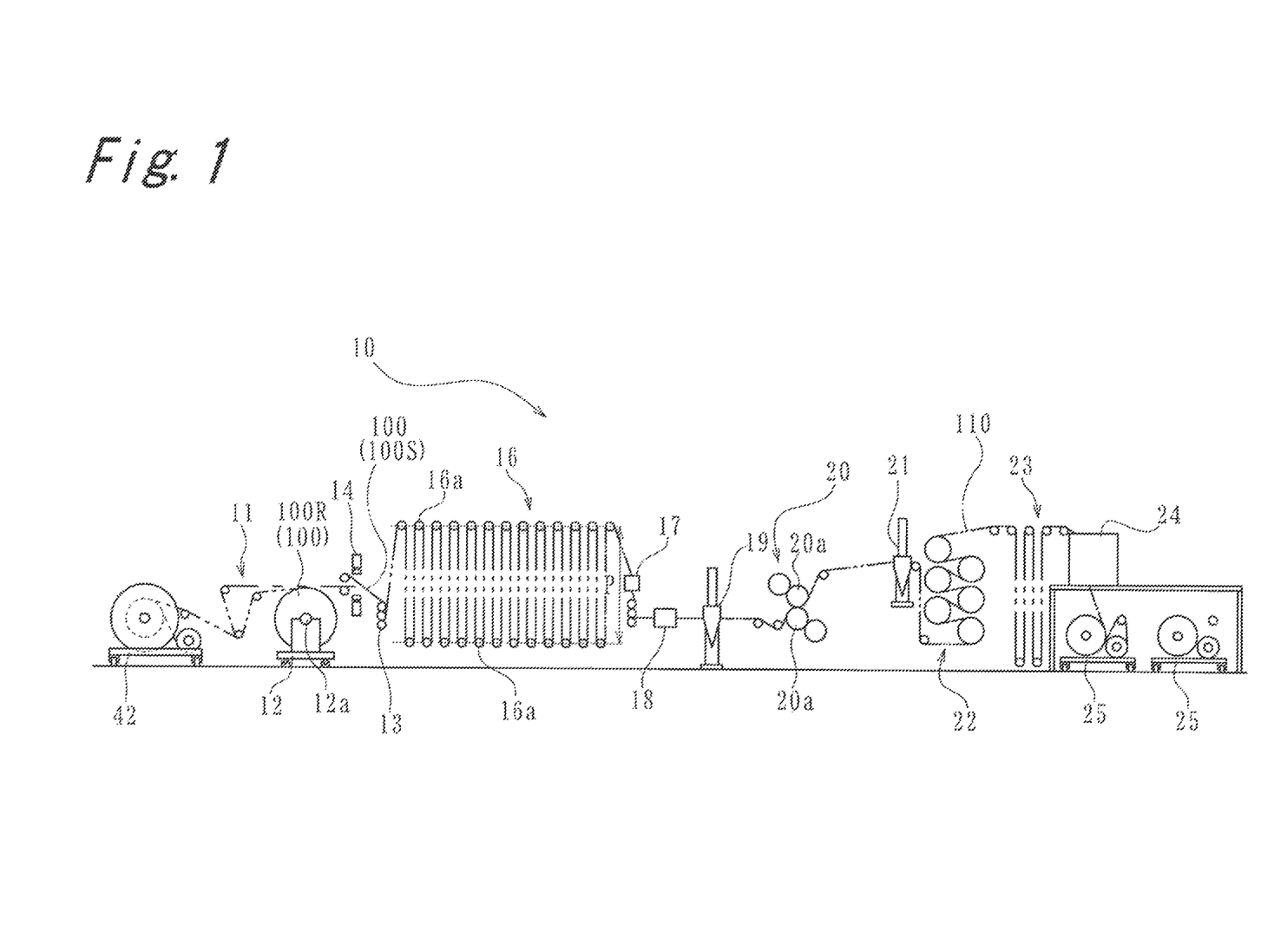
FIG. 1 is a view showing a schematic configuration of a calender line.

FIG. 1 is shows a schematic configuration of a calender line 10 for carrying out the calender step.

In the calender line 10, a feeding and division part 11, a calender unit 20 (calender part), and a topping sheet wind-up unit 24 are provided in this order from the upstream in the carrying direction (the left side in the figure). The feeding and division part 11 feeds the textile original fabric 100 downstream (to the right side in the figure) and divides the textile original fabric 100. The calender unit 20 (calender part) tops at least one surface of the divided textile original fabric 100 with unvulcanized rubber. The topping sheet wind-up unit 24 cylindrically winds up the textile original fabric 100 topped with the unvulcanized rubber on the wind-up cart 25.

Figure 2:
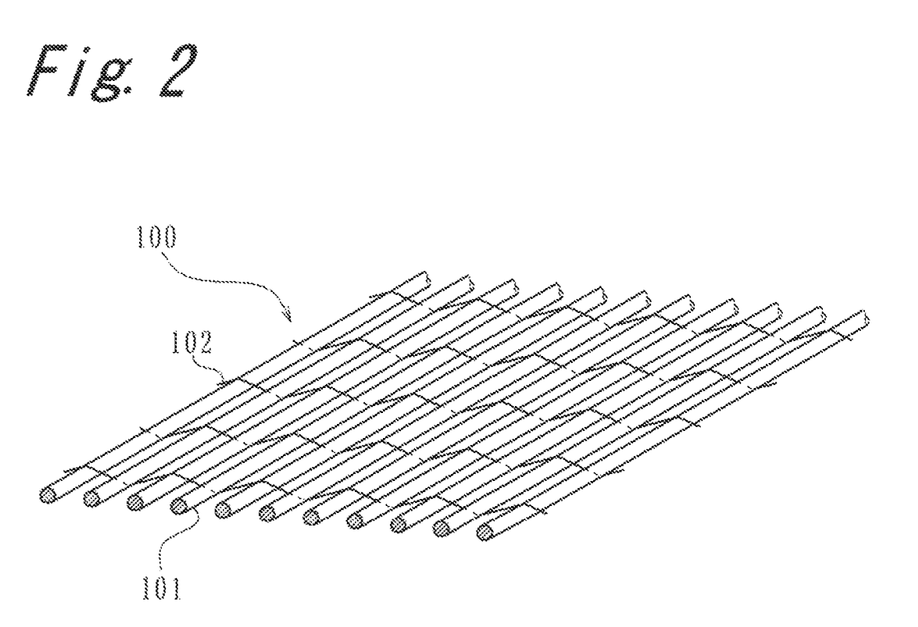
FIG. 2 is a perspective view schematically showing a textile original fabric.

In the feeding and division part 11, the textile original fabric 100 is wound around a roller 12a provided on the cart 12 and held as a cylindrical original fabric roll 100R. As shown in FIG. 2, the textile original fabric 100 is configured as a cord fabric woven by using as warps a plurality of longitudinally aligned tire cords 101 and providing weft yarns 102 as wefts at each required longitudinal interval.

Figure 3:
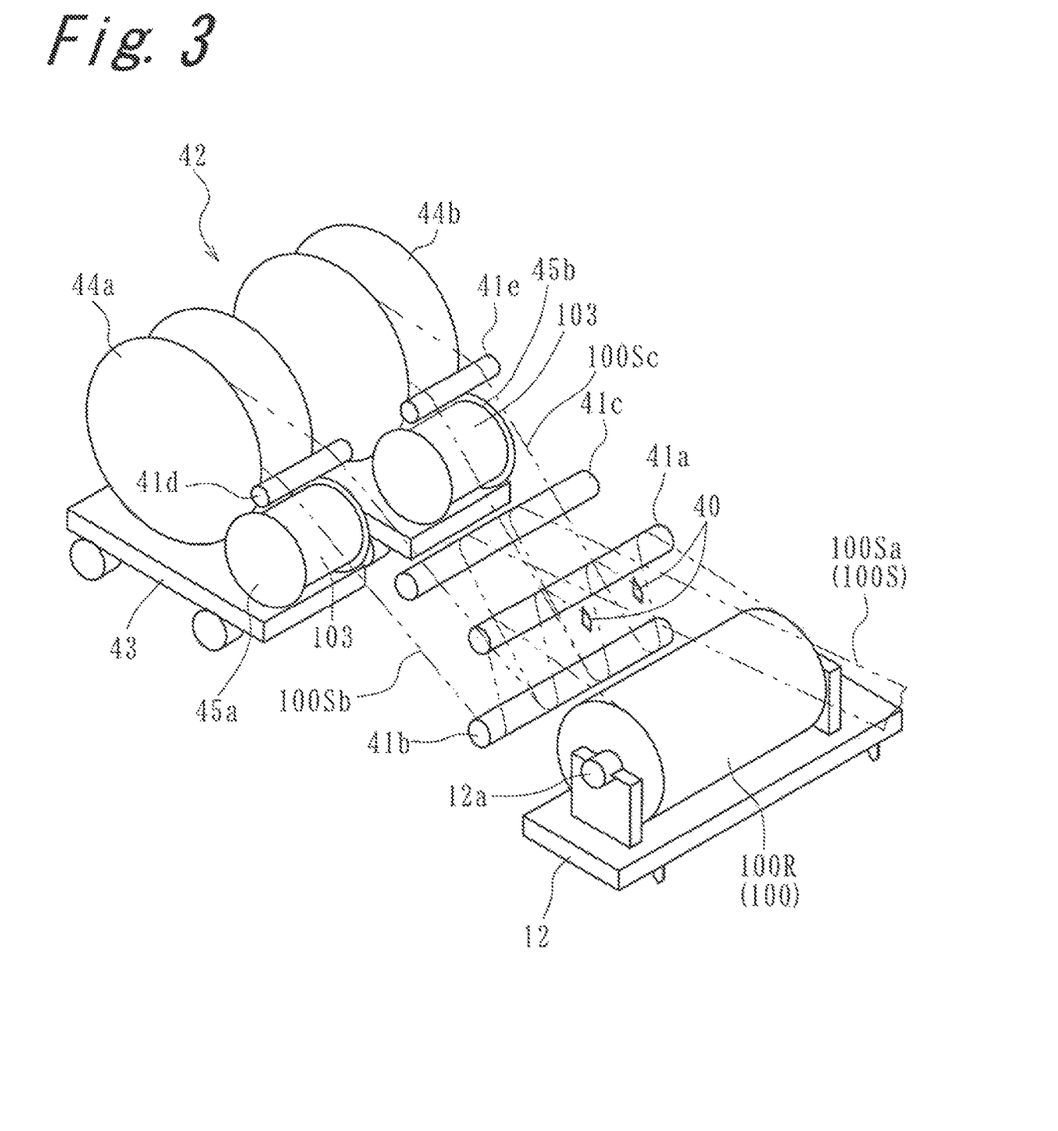
FIG. 3 is a perspective view schematically showing a feeding and division part of FIG. 1.

As shown in FIG. 3, cutters 40 are provided (in two places here) in the vicinity of the cart 12, and the textile original fabric being fed is cut off into a predetermined width dimension so as to obtain a plurality (three rows here) of narrow textile original fabrics 100S. One (a first narrow textile original fabric 100Sa) of the obtained narrow textile original fabrics 100S is carried to the calender line 10 through a first roller 41a, a second roller 41b, and a third roller 41c, and the surface thereof is topped. Meanwhile, the remaining narrow textile original fabrics (a second narrow textile original fabric 100Sb and a third narrow textile original fabric 100Sc) are wound up in an original fabric wind-up parts 42 through the first roller 41a, the second roller 41b, and a fourth roller 41d or a fifth roller 41e. The original fabric wind-up part 42 includes, on a cart 43, wind-up rollers 44a, 44b and film supply rollers 45a, 45b. At the time of winding up the second narrow textile original fabric 100Sb or the third narrow textile original fabric 100Sc on the wind-up roller 44a or 44b, the film member 103 is supplied from the film supply roller 45a or 45b and wound up together. This film member 103 prevents the tire cords 101 of the wound-up narrow textile original fabrics 100Sb and 100Sc from falling off the side edges that are cut-off positions, namely losing the support by the weft yarns 102, and slipping down to the lower layer side.

Figure 4A:
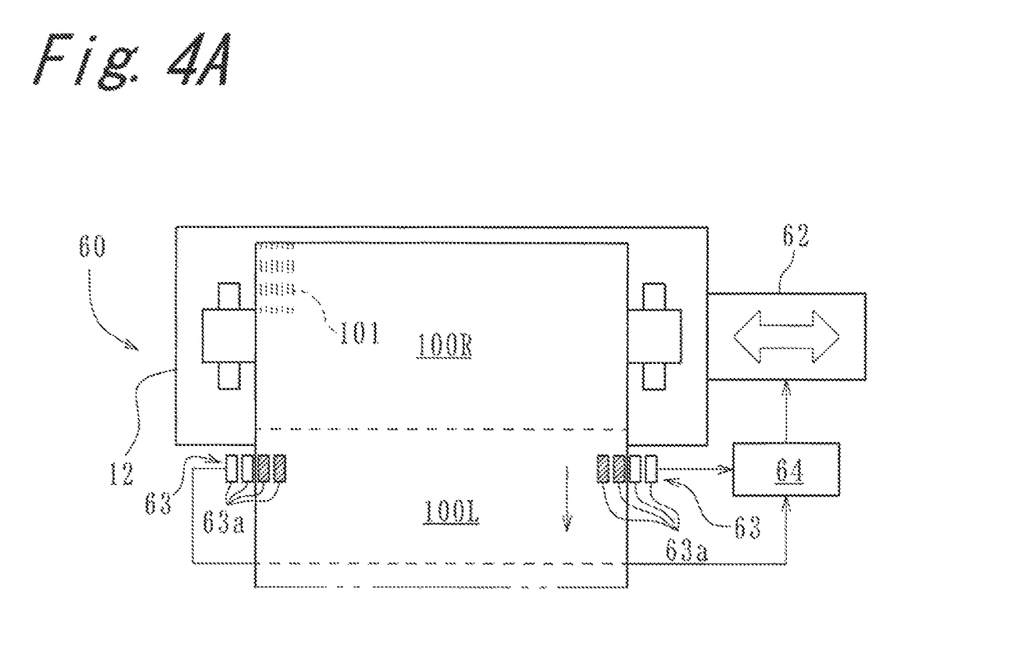
FIG. 4A is a plan view schematically showing a cart in the feeding and division part of FIG. 3.

As shown in FIG. 4A, the cart moving unit 62 makes the cart 12 movable widthwise along the textile original fabric 100. The detection device 63 detects the position of the widthwise end of the wide textile original fabric 100L being fed from the cart 12. The control unit 64 is input with a result of the detection made in the detection device 63.

The cart moving unit 62 is configured such that rotationally driving a ball screw, for example, can move the cart 12 to a desired widthwise position of the textile original fabric 100.

The detection device 63 is made up of a plurality of photoelectric tubes 63a provided in parallel widthwise in the vicinities of the ends of the wide textile original fabric 100L, for example. In the present embodiment, four photoelectric tubes 63a are provided in parallel widthwise in the vicinity of each of the widthwise ends of the wide textile original fabric 100L.

The control unit 64 includes a displacement detecting part that detects a widthwise displacement amount Z (cf. FIG. 4B) of the end of the textile original fabric 100 based on the detection result of the detection device 63, and a driving controlling part that drives and controls the cart moving unit 62. On the basis of the detection result of the detection device 63, namely the detection results of the plurality of photoelectric tubes 63a, the displacement detecting part detects the widthwise displacement amount Z of the end of the textile original fabric 100. The driving controlling part drives and controls the cart moving unit 62 so as to move the cart 12 widthwise along the textile original fabric 100 based on the widthwise displacement amount Z of the textile original fabric 100 which has been detected by the displacement detecting part, so that the displacement is eliminated.

Figure 4B:
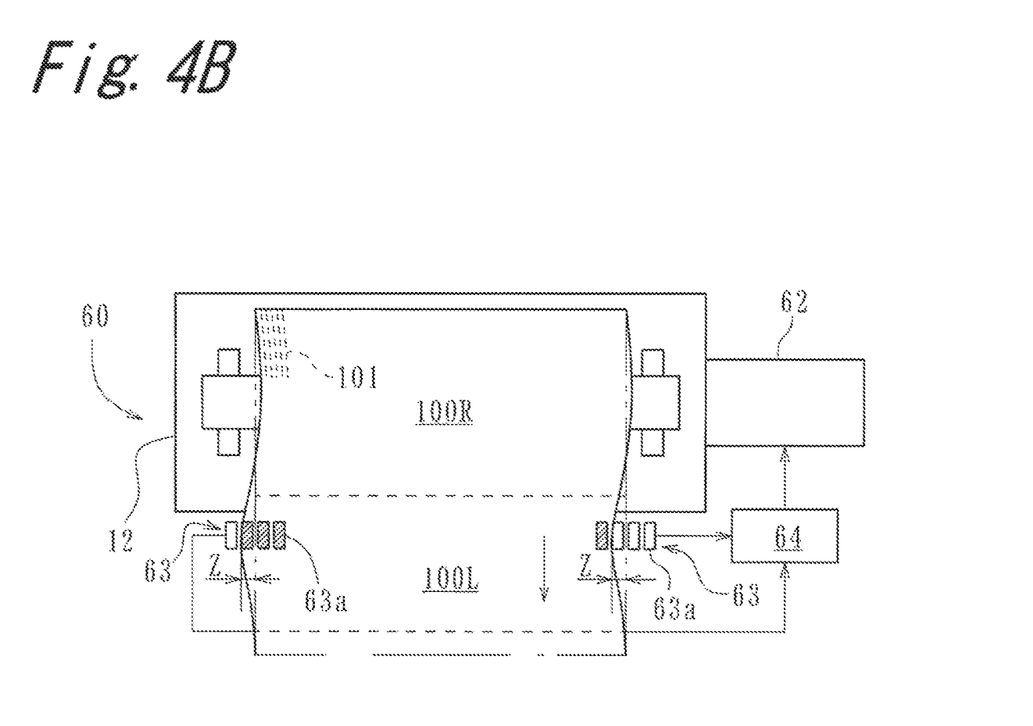
FIG. 4B is a plan view for explaining operation of the cart shown in FIG. 4A.

For example, as shown in FIG. 4B, when three widthwise inner-end photoelectric tubes 63a of the photoelectric tubes 63a on the left side of the plurality of photoelectric tubes 63a detect the textile original fabric 100 and one widthwise inner-end photoelectric tube 63a of the photoelectric tubes 63a on the right side of the above photoelectric tubes 63a detects the textile original fabric 100 as shown by hatching in the figure, the displacement detecting part detects that the textile original fabric 100 fed from the cart 12 is being fed to a widthwise biased position (the left in the figure) by the displacement amount Z. In FIG. 4B, symbol Z denotes an amount of displacement with respect to the wide textile original fabric 100L being fed to the widthwise center.

Figure 4C:
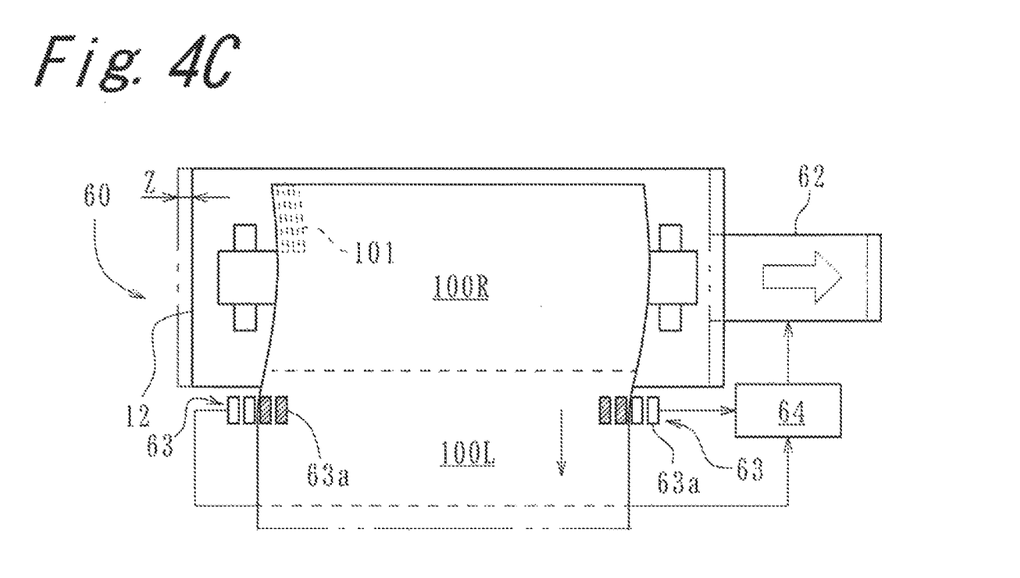
FIG. 4C is a plan view for explaining operation of the cart shown in FIG. 4A.

In this case, a driving controlling part drives and controls the cart moving unit 62 so as to eliminate the widthwise displacement of the textile original fabric 100 being fed. That is, the driving controlling part drives and controls the cart moving unit 62 so as to move the cart 12 by the displacement amount Z in the direction (to the right in the figure) opposite to the displacement direction (the left in the figure), so as to eliminate the displacement of the textile original fabric 100. The cart 12 is thus moved to the right by the displacement amount Z as shown in FIG. 4C, thereby eliminating the widthwise displacement and centering the textile original fabric 100 fed from the cart 12.

In the cart moving unit 62, the textile original fabric 100 is fed while the widthwise displacement is prevented, and the textile original fabric 100 is then divided widthwise and wound up in the original fabric wind-up part 42. This enables formation of the narrow textile original fabrics 100Sa to Sc prevented from varying widthwise. Moreover, the widthwise variations in the wide textile original fabric 100L in the wound state can be eliminated, to allow lowering of the required quality of the widthwise variations for the wide textile original fabric 100L in the wound state.

As shown in FIG. 1, the feeding unit 13 is provided downstream from the feeding and division part 11. The feeding unit 13 feeds the first narrow textile original fabric 100Sa, supplied from the feeding and division part 11, downstream from the calender line 10. A junction unit 14 is provided between the feeding and division part 11 and the feeding unit 13. When a terminal end of the first narrow textile original fabric 100Sa being fed from the cart 12 comes out, the junction unit 14 joins this terminal end with a starting end of the second narrow textile original fabric 100Sb or the third narrow textile original fabric 100Sc having been wound on the any of original fabric wind-up parts 42. This enables the narrow textile original fabric 100S to be fed successively.

A first festoon unit 16 is provided downstream from the feeding unit 13. The first festoon unit 16 includes a plurality of vertically disposed rollers 16a, and the plurality of rollers 16a are configured with vertical pitches P being variable. The textile original fabric 100 is wound on the plurality of rollers 16a in a vertically alternate manner. That is, the first festoon unit 16 can make a carrier path longer by extending the pitch P, to store a required amount of the textile original fabric 100 as a buffer. The first festoon unit 16 can make the carrier path shorter by shortening the pitch P, to supply the textile original fabric 100 downstream from the buffer.

That is, when the feeding of the narrow textile original fabric 100S is to be temporarily stopped in the feeding and division part 11, the first festoon unit 16 supplies downstream the narrow textile original fabric 100Sa stored as the buffer. Namely, a decrease in operating rate of the calender line 10 can be prevented by keeping the calender line 10 from stopping.

A centering unit 17, a weft yarn removing unit 18, and a first dancer unit 19 are provided in this order downstream from the first festoon unit 16. The centering unit 17 adjusts a widthwise position of the narrow textile original fabric 100S to the center. The weft yarn removing unit 18 divides the weft yarns 102 of the narrow textile original fabric 100S and removes them from the tire cords 101. The first dancer unit 19 adjusts a path length of the narrow textile original fabric 100S with the weft yarns removed therefrom.

The calender unit 20 is provided downstream from the first dancer unit 19. The calender unit 20 allows passage of the plurality of tire cords 101 between a pair of calender rolls 20a, 20a, to make topping with the unvulcanized rubber from at least one surface of each of the tire cords 101.

A second dancer unit 21 and a cooling unit 22 are provided in this order downstream from the calender unit 20. A topping sheet 110 obtained by making topping with the unvulcanized rubber in the calender unit 20 passes through the second dancer unit 21 and is then cooled by the cooling unit 22.

A second festoon unit 23 and a topping sheet wind-up unit 24 are provided in this order downstream from the cooling unit 22. Two wind-up carts 25, 25 are disposed in the topping sheet wind-up unit 24, and the topping sheet 110 carried through the second festoon unit 23 is alternately wound up on the two carts 25. Note that the second festoon unit 23 ensures the buffer at the time of switching the cart 25, to prevent stoppage of the calender line 10.

(Ply Original Fabric Forming Step)

Figure 5:
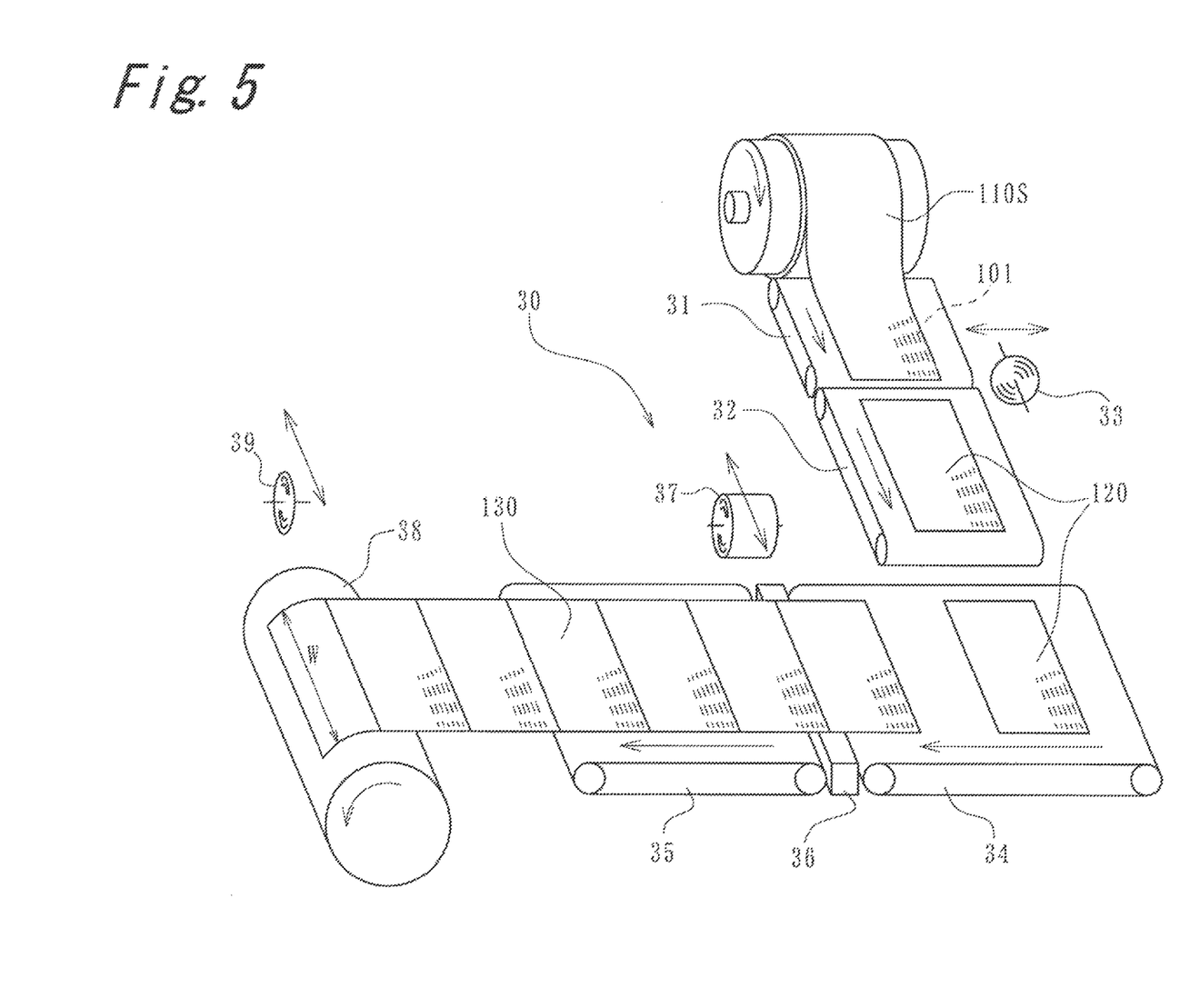
FIG. 5 is a perspective view schematically showing a ply original fabric forming step.

FIG. 5 schematically shows a ply original fabric forming line 30 where the ply original fabric forming step is carried out.

The first half of the ply original fabric forming line 30 is provided with a first conveyor 31 and a second conveyor 32 that feed the cylindrically wound topping sheet 110 with a predetermined length, and a first cutting unit 33 that moves widthwise between these conveyors. The latter half of the ply original fabric forming line 30 is provided with a third conveyor 34, a fourth conveyor 35, a coupling stage 36 located between these conveyors, and a pressing unit 37 movable widthwise on the coupling stage 36.

That is, in the first half of the ply original fabric forming line 30, the topping sheet 110 with the predetermined length is fed by the first and second conveyors 31, 32, and then cut off by the first cutting unit 33 into strip-shaped ply pieces 120. The predetermined length is here set to a length corresponding to a width W of the carcass ply. In the present embodiment, the topping sheet 110 is cut off at an angle substantially orthogonal to the tire cord 101, but it may be cut off at an angle of about 75° to 90° with respect to the tire cord 101 so as to form carcass ply for a pneumatic radial tire.

Subsequently, the strip-shaped ply pieces 120 are transferred to the latter half of the ply original fabric forming line 30, and carried parallel to the direction of the cutting by the first cutting unit 33 (i.e., perpendicularly to the carrying direction in the first half) by the third and fourth conveyors 34, 35. At this time, the third and fourth conveyors 34, 35 operate such that a carrying-direction rear edge of the preceding ply piece 120 is butted with a carrying-direction front edge of the subsequent ply piece 120 on the coupling stage 36. The pressing unit 37 moves widthwise while the mutually facing edges of the sequentially carried ply pieces 120 are butted with each other on the coupling stage 36, to sequentially couple these ply pieces 120.

That is, the strip-shaped ply pieces 120 are cut off from the topping sheet 110, and the ply pieces 120 are sequentially coupled, to form the long ply original fabric 130. The ply original fabric 130 is directly supplied to the tire molding step without being wound up cylindrically, and is then wound up on a molding drum 38. The ply original fabric 130 wound up on the molding drum 38 is cut off by a second cutting unit 39 to have a length corresponding to a circumferential length of the tire.

What is claimed is:

1. A topping sheet forming method comprising:
    a feeding and division step of feeding a textile original fabric, obtained by weaving longitudinally aligned tire cords into a cord fabric by use of weft yarns, and cutting off the weft yarns in predetermined widthwise positions to divide the textile original fabric into a plurality of narrow textile original fabrics;
    a calender step of topping, with unvulcanized rubber, at least one surface of only one of the divided narrow textile original fabrics; and
    a wind-up step of winding up the other of the divided narrow textile original fabrics without topping with unvulcanized rubber.

2. The topping sheet forming method according to claim 1,
    wherein the textile original fabric is fed by
    detecting widthwise displacement of the one textile original fabric being fed, and
    moving the textile original fabric widthwise so as to eliminate the detected displacement.

3. The topping sheet forming method according to claim 1, wherein in the wind-up step, the other narrow textile original fabric is wound up through a film.

4. The topping sheet forming method according to claim 3,
    wherein the textile original fabric is fed by
    detecting widthwise displacement of the one textile original fabric being fed, and
    moving the textile original fabric widthwise so as to eliminate the detected displacement.

* * * * *